No. 872,169. PATENTED NOV. 26, 1907.
H. CLAYTON.
PIPE CONNECTION.
APPLICATION FILED MAY 15, 1906.

Witnesses
C. P. Wright Jr.
A. W. Ehrling.

Inventor
Herbert Clayton,
By A. S. Pattison,
Attorney

THE NORRIS PETERS CO., WASHINGTON, D. C.

UNITED STATES PATENT OFFICE.

HERBERT CLAYTON, OF BROOKLYN, NEW YORK.

PIPE CONNECTION.

No. 872,169.  Specification of Letters Patent.  Patented Nov. 26, 1907.

Application filed May 15, 1906. Serial No. 317,038.

*To all whom it may concern:*

Be it known that I, HERBERT CLAYTON, a citizen of the United States, residing at Brooklyn, in the county of Kings and State of New York, have invented certain new and useful Improvements in Pipe Connections, of which the following is a specification, reference being had therein to the accompanying drawing.

My invention relates to improvements in pipe connections, and pertains more particularly to connecting a pipe to a spigot or faucet.

The object of my invention is to provide a connection of this character, which is adapted to fit faucets of different sizes, and in which a tight connection therewith is at all times obtained, and in which a tight connection between the tube and the coupling is also obtained. The construction and arrangement of parts is such that each and all of the parts may be readily removed for replacing any worn out part.

Another object of my invention is to provide a more simple, cheap and effective device of this character which may be readily and easily attached to faucets of different sizes.

Figure 1:
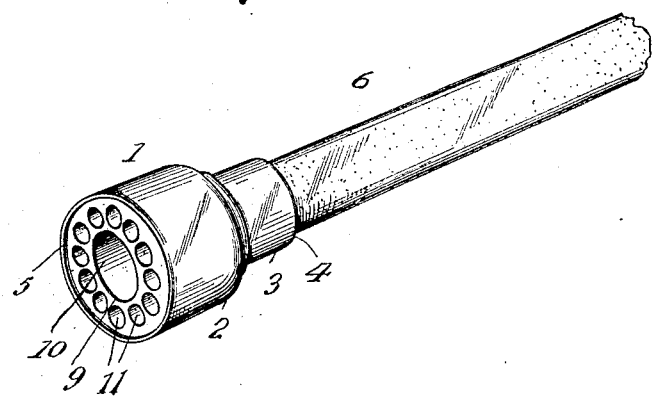
Figure 2:
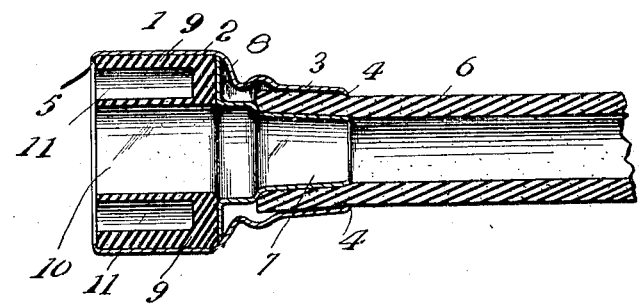
Figure 3:
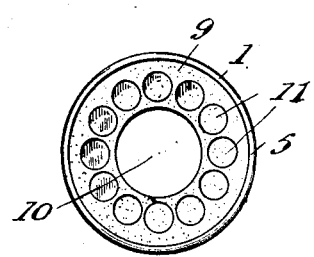

In the accompanying drawings, Figure 1, is a perspective view of my improved connection. Fig. 2, is a longitudinal sectional view. Fig. 3, is an end view of Fig. 1.

Referring now to the drawings, 1 represents my improved connection which, as shown, is in the form of a socket which is provided at one end with the inwardly-curved, contracted portion 2 terminating in an elongated neck portion 3, the walls of which are slightly converging or at a slight angle with the walls of the socket. The end of said neck portion is provided with a slight inwardly-turned flange 4, the purpose of which will be hereinafter more fully described. The outer end of the socket is also provided with an inwardly-turned annular flange 5.

My device as will be understood, is for making a water-tight connection between a rubber tube and a faucet, without the use of threads, so that the same may be readily coupled or uncoupled, and is more especially designed to be used in connection with a portable shower bath. The socket forms, as shown and described, a tight connection between the tube and the socket, and also with the faucet or other source of water supply. The rubber tube or pipe 6 is of a diameter less than that of the distance between the annular flange 4 of the neck, and extends through the socket.

Inserted in the end of the pipe is a thimble 7 which is of a size slightly greater than the tube, and said tube is expanded over the same and forms, as shown in Fig. 2, an enlarged portion which, when the thimble is forced into the socket, abuts against the flange 4 and locks the pipe securely on the thimble and prevents the pipe from passing out of the socket. The tube forms, as seen in Fig. 2, a water tight joint with the neck of the coupling.

The thimble, as shown, is formed with an outwardly-extending flange 8 which rests upon the contracted portion of the socket, and forms a base for the rubber gasket 9. The said gasket is, as shown, of an elongated form to snugly fit within the socket, between the flange 8 of the thimble and the flange 5 of the socket, and firmly held therein by the flange. The gasket is provided with an opening 10 therethrough, and which is of a size approximately that of the ordinary faucet, and the same is forced over the faucet. The said gasket is provided with elongated recesses 11 starting at the outer end and extending adjacent the inner end. The said openings, as shown, are arranged equal distances apart, and extend entirely around the central opening and form a more flexible gasket, which allows a greater expansion thereof, yet the openings only extending partially through the gasket perform the same function as a solid gasket to form a water-tight joint.

Having thus described my invention, what I claim and desire to secure by Letters Patent, is:—

1. A resilient expansible coupling comprising a resilient gasket having a longitudinal open ended passage, and means for connecting one end of the passage with a pipe, the gasket provided with longitudinal openings outside of the wall of the said longitudinal passage, whereby the outer end of the passage is adapted to be expanded to receive a pipe of relatively larger diameter.

2. A resilient expansible coupling comprising a resilient gasket having a longitudinal open-ended passage, and means for connecting one end of the passage with the pipe, the gasket having longitudinal openings located outside of the wall of the passage, and extending inward from the outer end of the gasket, whereby the outer end of the passage is adapted to be expanded to receive a pipe of relatively larger diameter.

3. The combination with a socket, of a gasket therein, and having longitudinal recesses therein, and means for securing a tube within said socket.

4. The combination with a socket, of a gasket therein, and having longitudinal recesses surrounding the opening in the gasket, and means for securing a tube within said socket.

5. A resilient expansible coupling comprising a resilient gasket having a longitudinal open end, passage, means for connecting one end of the passage with a pipe, the gasket provided with longitudinal openings or recesses between the passage and the outer face of the gasket, whereby the said passage is adapted to be expanded to receive a pipe of relatively larger diameter.

6. A resilient expansible coupling, comprising a resilient gasket having a longitudinal open end passage, a socket receiving the gasket for connecting one end of the passage with a pipe, the gasket provided with longitudinal openings or recesses between the passage-way and the socket, whereby the said passage is adapted to be expanded to receive a pipe of relatively larger diameter.

7. The combination with a socket, having a reduced neck portion, a thimble within the socket and having a flange resting upon the reduced portion of the socket, a rubber tube passing into the reduced portion of the socket, and expanded over the thimble, a rubber gasket within the socket and having elongated recesses surrounding the opening therein, and a flange carried by the socket for holding the gasket in the socket.

8. The combination with a socket having a reduced neck portion having an inwardly-extending flange, a thimble within the socket and having a flange resting upon the reduced portion of the socket, a rubber tube passing into the reduced portion of the socket and expanded over the thimble, a rubber gasket within the socket and having elongated recesses surrounding the opening therein, and a flange carried by the socket for holding the gasket in the socket.

9. The combination with a socket having a reduced neck portion having an inwardly-extending flange, a thimble within the socket and having a flange resting upon the reduced portion of the socket, a rubber tube passing into the reduced portion of the socket and expanded over the thimble, a rubber gasket within the socket and having elongated recesses extending inwardly from the outer end and surrounding the opening therein, and a flange carried by the socket for holding the gasket in the socket.

10. The combination with a socket, a thimble within said socket and having means for preventing it from passing from the socket, a rubber tube passing into the socket and expanded over the thimble, and a rubber gasket within the socket and having longitudinal recesses extending inwardly from the outer end and surrounding said opening.

11. The combination with a socket having a reduced neck portion having an inwardly-extending flange, a thimble within the socket and having an outwardly-extending flange resting upon the reduced portion of the socket, the said thimble having an elongated reduced portion, a rubber tube passing into the reduced portion of the socket and expanded over the elongated reduced portion of the thimble, a rubber gasket within the socket and having elongated recesses extending inwardly from the outer end and surrounding the opening therein, and a flange carried by the socket for holding the gasket therein.

12. The combination with a socket having a reduced neck portion having an annular recess and an inwardly-extending flange, a thimble within the socket and having an outwardly-extending flange resting upon the reduced portion of the socket, a rubber tube passing into the neck portion of the socket and having its end ending opposite the annular recess, and expanded over the thimble, a rubber gasket within the socket and having its inner end resting against the thimble and having elongated recesses extending inwardly from the outer end, and surrounding the opening therein, and a flange carried by the socket for holding the gasket therein.

In testimony whereof I affix my signature in presence of two witnesses.

HERBERT CLAYTON.

Witnesses:
O. C. PATTERSON,
FRED J. GANS.